(12) United States Patent
Lyons, Jr. et al.

(10) Patent No.: US 8,754,331 B2
(45) Date of Patent: Jun. 17, 2014

(54) STRAIN RELIEF DEVICE

(75) Inventors: Thomas E. Lyons, Jr., Rio Medina, TX (US); Richard L. Simmons, Leander, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 179 days.

(21) Appl. No.: 13/389,529

(22) PCT Filed: Aug. 26, 2010

(86) PCT No.: PCT/US2010/046780
§ 371 (c)(1),
(2), (4) Date: Feb. 8, 2012

(87) PCT Pub. No.: WO2011/025869
PCT Pub. Date: Mar. 3, 2011

(65) Prior Publication Data
US 2012/0142212 A1    Jun. 7, 2012

Related U.S. Application Data

(60) Provisional application No. 61/238,273, filed on Aug. 31, 2009.

(51) Int. Cl.
*H01B 7/00* (2006.01)
*H01R 13/44* (2006.01)
*H01R 13/58* (2006.01)

(52) U.S. Cl.
USPC .............................. 174/135; 439/135; 439/459

(58) Field of Classification Search
USPC .................... 439/135, 445, 459, 942; 174/135
See application file for complete search history.

(56) References Cited

U.S. PATENT DOCUMENTS

| | | | | |
|---|---|---|---|---|
| 3,861,778 A | * | 1/1975 | Capra | 439/461 |
| 4,435,034 A | * | 3/1984 | Aujla et al. | 439/404 |
| 4,719,321 A | * | 1/1988 | Kozel et al. | 174/135 |
| 5,080,606 A | * | 1/1992 | Burkard | 439/403 |
| 5,109,458 A | | 4/1992 | Dixit | |
| 5,325,584 A | | 7/1994 | Jasch | |
| 5,562,478 A | * | 10/1996 | Yamamoto | 439/402 |
| 5,675,128 A | * | 10/1997 | Simon | 174/152 G |
| 5,685,731 A | * | 11/1997 | Lin | 439/344 |
| 5,689,598 A | * | 11/1997 | Dean et al. | 385/59 |
| 5,890,924 A | * | 4/1999 | Endo et al. | 439/417 |
| 6,056,586 A | | 5/2000 | Lin | |
| 6,361,360 B1 | | 3/2002 | Hwang | |
| 6,494,739 B1 | | 12/2002 | Vivenzio | |
| 7,400,814 B1 | * | 7/2008 | Hendrickson et al. | 385/135 |
| 7,416,434 B2 | * | 8/2008 | Saha et al. | 439/402 |
| 2005/0227529 A1 | * | 10/2005 | Mrakovich et al. | 439/402 |
| 2008/0210829 A1 | * | 9/2008 | Hetzer et al. | 248/68.1 |

FOREIGN PATENT DOCUMENTS

FR    1304739    8/1962
JP    10-048483    2/1998

* cited by examiner

*Primary Examiner* — Jeremy C. Norris
*Assistant Examiner* — Sherman Ng
(74) *Attorney, Agent, or Firm* — Janet A. Kling (57) ABSTRACT

Disclosed is an exemplary strain relief device. The strain relief device includes a tubular body having a central bore, a plurality of cable passages disposed around the central bore, and a plug to block the central bore and secure the one or more telecommunication drop cables in the cable passages. the central bore defines a longitudinal axis and an interior surface of the tubular body. The central bore has a perimeter that is larger than a perimeter of each of the plurality of cable passages.

14 Claims, 7 Drawing Sheets

STRAIN RELIEF DEVICE

CROSS REFERENCE TO RELATED APPLICATIONS

This application is a national stage filing under 35 U.S.C. 371 of PCT/US2010/046780, filed Aug. 26, 2010, which claims priority to U.S. Provisional Application No. 61/238,273, filed Aug. 31, 2009, the disclosure of which is incorporated by reference in its/their entirety herein.

BACKGROUND

1. Field of the Invention

The present invention generally relates to a strain relief device for use in a telecommunication enclosure, and more particularly to a device for securing a plurality of drop cables in an entrance portion of a telecommunication enclosure.

2. Description of the Related Art

Cables, such as telecommunication cables and electrical power distribution cables, are ubiquitous and used for distributing electrical power and all manner of data signals across vast networks. The majority of cables are electrically conductive cables (typically copper), although the use of optical fiber cables is growing rapidly in telecommunication systems as larger and larger amounts of data are transmitted. As cables are routed across power or data networks, it is necessary to periodically open, connect, or splice the cable so that power or data may be distributed to other cables or "branches" of the network. The cable branches may be further distributed until the network reaches individual homes, businesses, offices, and so on.

At each point where the cable is opened, it is necessary to protect the exposed interior of the cable. Commonly, a telecommunication enclosure is used that has one or more entry portions through which cables enter and/or exit the enclosure. The capacity of the enclosure will vary depending upon the number of entry portions in the enclosure, the sizes of the entry portions, the number of cables entering the enclosure, and the sizes and number of cables passing through each entry portion will vary. Often, when smaller diameter cables are used in distribution lines, multiple cables are bundled for placement through a single entry portion. This is particularly common where multiple smaller cables are routed from a single point to multiple locations, such as individual homes, buildings, offices, etc.

In premise installations, a wall mount box or enclosure is usually employed to receive communication devices. Frequently, this type of enclosure is located in basements, communication closets, or service hallways of office buildings, professional suites, hospitals, apartment buildings and the like. Regardless of the number of cables passing through each entry portion of the telecommunication enclosure, it is often desirable or necessary to provide an environmental seal around the cables to prevent the ingress of moisture, dust, insects, and the like into the enclosure.

Preterminated cables having a connector mounted on at least one end of the cable are frequently used in many premise installations to simplify installation of the final service connection to the customer. Frequently, the connector on the end of the cable is substantially larger than the cable diameter. Insertion of the connector through the entry portion of the telecommunication enclosure and the subsequent sealing around the cable can pose a challenge when an environmental seal is needed.

Conventional cable sealing techniques include bundling cables with mastic materials, rubber-like tapes, self-vulcanizing tapes, gels, potting compounds, and the like. The quality of the resulting seal is highly dependent upon the skill of the installer. Thus, the reliability of the seal can be inconsistent from one installer to another. Further, as the number of cables increases, it becomes more difficult to form a reliable environmental seal. Additionally, many conventional sealing methods can present difficulties when re-entering the telecommunication enclosure, such as when adding cables to or removing cables from the cable entry portion of the enclosure. Specifically, the old sealing materials must be removed without damaging the cables, and a new seal must be constructed. The removal and reconstruction of the seal requires the use of additional time and materials, and therefore adds to the cost of maintaining or expanding the network.

To address the disadvantages of seals formed with mastic and rubber-like tape, pre-formed grommets have been used to expand the capacity of cable entry portions of a telecommunication enclosure. Typically, the grommets are designed to fit within an enclosure's entry portion, and have a predetermined number of holes sized to accept multiple smaller diameter cables. However, conventional grommets are not designed to allow the insertion of a modular connector therethrough.

A need exists for a strain relief device that accommodates the installation of preterminated telecommunication cables having a connector on a terminal end of the cable. In addition, the strain relief device should provide a reliable environmental seal around the telecommunication cable regardless of the number of cables installed in the device. Finally, the strain relief device should also allow subsequent addition of one or more new preterminated cables through the entry portion without disturbing the previously installed cables.

SUMMARY

The present invention is directed to a strain relief device for use in a telecommunication enclosure to provide strain relief and an environmental seal for telecommunication drop cables entering the enclosure. The strain relief device allows the passage of one or more telecommunication drop cables.

In one aspect, the strain relief device includes a tubular body having a central bore, a plurality of cable passages disposed around the central bore, and a plug to block the central bore and secure the one or more telecommunication drop cables in the cable passages. The central bore defines a longitudinal axis and an interior surface of the tubular body. A perimeter of the central bore is larger than a perimeter of each of the plurality of cable passages.

In an another aspect, the telecommunication cable can be a preterminated drop cable having a connector disposed on a terminal end of the cable and the central bore through the tubular body is sized to allow the connector to be inserted therethrough.

In another aspect a method is provided for installing a pre-terminated drop cable into a telecommunication enclosure through a strain relief device. The pre-terminated drop cable comprises a connector mounted on a terminal end of a drop cable. The strain relief includes a tubular body having a central bore extending therethrough and a plurality of cable passages formed in the tubular body and disposed around the central bore. The connector and a portion of the drop cable of the preterminated drop cable are inserted through the central bore of the tubular body. The drop cable is moved into one of the plurality of cable passages from the central bore, and a plug is inserted into the central bore of the tubular housing to block the central bore.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to a strain relief device for use in a telecommunication enclosure to provide strain relief and an environmental seal for telecommunication drop cables entering the enclosure. To facilitate installation of the telecommunication drop cables, preterminated drop cables having a connector mounted on the end of cable are preferred. Using a preterminated drop cable allows the installer to make the network connection by simply plugging the connector on the end of the preterminated drop cable into an appropriate socket or coupling within the telecommunication enclosure.

An exemplary strain relief device 100 allows the passage of one or more telecommunication drop cables 50 therethrough as shown in FIG. 1A-C and FIG. 2. The exemplary strain relief device includes a tubular body 110 having a central bore 112 and a plurality of cable passages 114 disposed around the central bore extending through the tubular body, and a plug 130 to block the central bore and secure the one or more telecommunication drop cables in the cable passages. The central bore defines a longitudinal axis and an interior surface 111 of the tubular body.

Figure 1A:
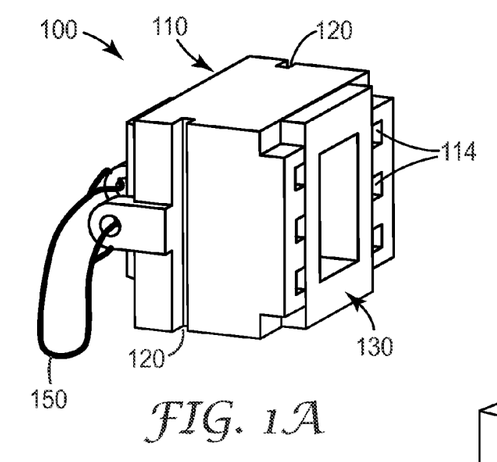
FIGS. 1A and 1B are two alternative isometric views of an exemplary strain relief device according to the current invention.

The central bore 112 has a cross section having a perimeter 113 substantially perpendicular to the longitudinal axis of the central bore. Additionally, the perimeter of the central bore is larger than a perimeter of each of the plurality of cable passages. The cross section of the central bore can be circular, rectangular or any other polygonal shape.

Referring to FIGS. 3B, 4A, 4C and 5A, the size of the central bore 112, 212, 412 through the tubular body 110, 210, 410 of the strain relief device can be selected to accommodate insertion of a connector 10, which is mounted on the end of a preterminated telecommunication drop cable 50, through the strain relief device.

Exemplary telecommunication drop cables 50 can be optical fiber drop cables such as, 3 mm jacketed drop cables, FRP drop cables or oval drop cables, electrical cables such as low pair count telecommunication drop cables, ethernet cables, or micro-coax cables or small diameter optical/electrical hybrid cables, etc.

In an exemplary aspect, connector 10 can be an optical fiber connector. Exemplary optical fiber connectors which can be used in conjunction with the exemplary strain relief device include SC, ST, FC, or LC format optical connectors, to name a few, and may be, for example, either a physical contact (PC) or an angled polished connector (APC) type of connector. Sample connectors include 3M™ No Polish Connector SC Plug, 3M™ Hot Melt LC Connector, and 3M™ CRIM-PLOK™ ST SM 126 UM Connector, each of which is available from 3M Company (St. Paul, Minn.). Alternatively, the exemplary optical fiber connector can be a multi-fiber optical fiber connector such as an MTP or MPO style connectors. In an alternative exemplary aspect, connector 10 can be an electrical connector. Exemplary electrical connectors which can be used in conjunction with the exemplary strain relief device include, for example, RJ-11, RJ-45 and micro-coax connectors.

The cable passages 114 extend longitudinally through the solid portion of the tubular body 110 surrounding and substantially parallel to the central bore 112. The cable passages may completely surround central bore 112 or may be around one or more portions of the central bore, such as disposed on two opposing sides of the central bore as shown in FIG. 3B.

The cable passages can be configured to accept any standard type of telecommunication drop cable. The shape of the cable passages can be selected to correspond to the cross-sectional shape of the telecommunication drop cables to be inserted therethrough.

Each of the cable passages 114 can be connected to the central bore 112 by a slit 116. The slit extends from the interior surface 111 of the tubular body to the cable passage. This configuration can be particularly useful when the telecommunication drop cable to be inserted through the strain relief device is preterminated with a connector. Slits 116 facilitate the insertion of a telecommunication drop cables into each of the plurality of cable passages 114.

Figure 3A:
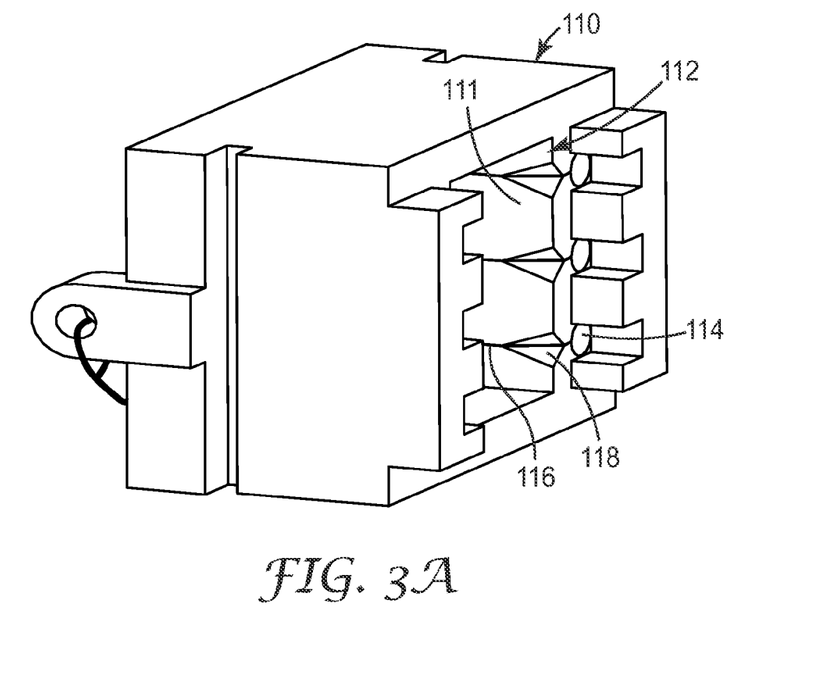
FIGS. 3A and 3B are two alternative views of a tubular body of the exemplary strain relief device of FIG. 1A.
Figure 3B:
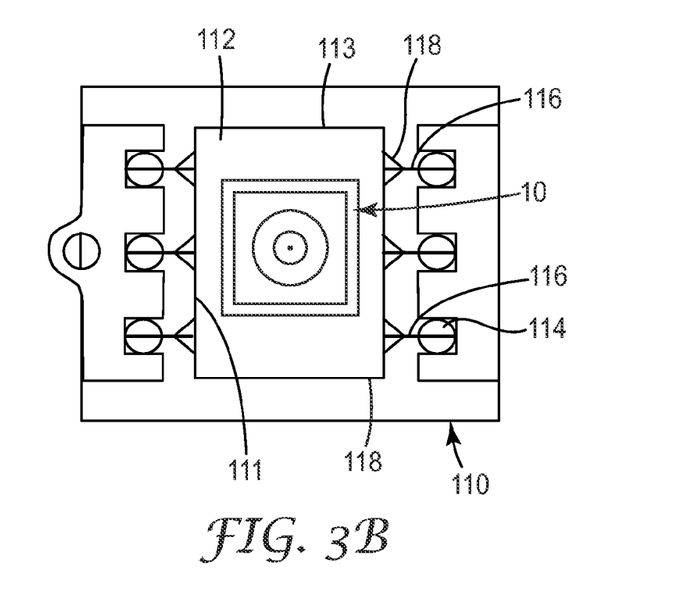
Figure 4A:
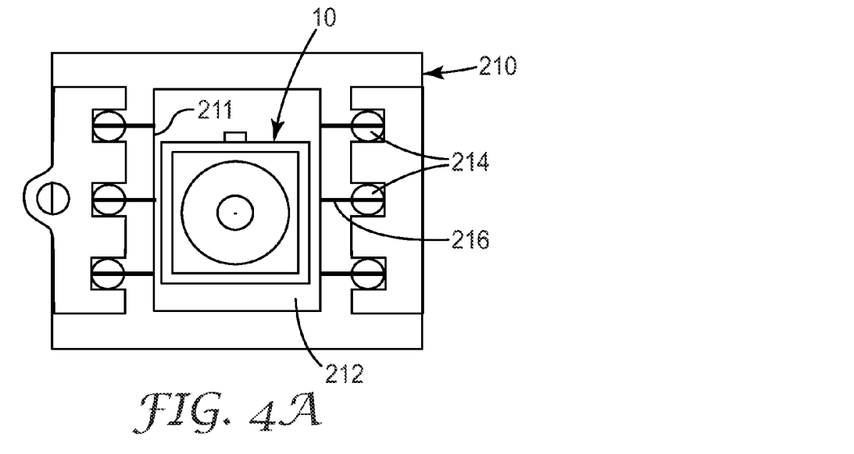
FIG. 4A-4C are top views several exemplary tubular bodies that can be used in strain relief devices according to the current invention.
Figure 4B:
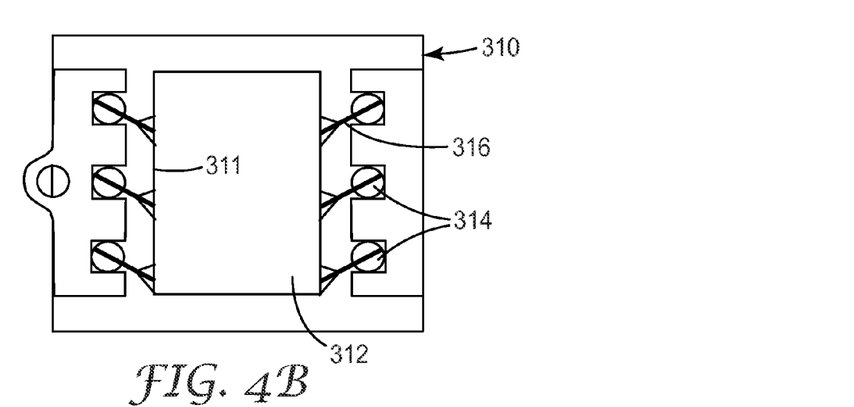
Figure 4C:
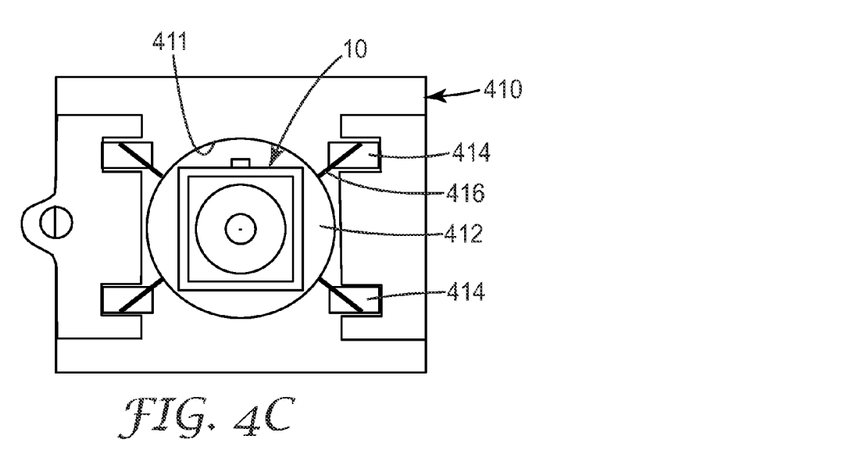

In one exemplary aspect, the slits 116, 216, 416 can extend generally perpendicular from the interior surface 111, 211, 411 of the tubular housing 110, 210, 410 as shown in FIGS. 3B, 4A and 4C. In another exemplary aspect as shown in FIG. 4B, the slit 316 extend from the interior surface 311 of the tubular housing 310 at an acute angle relative to a tangent of the interior surface at the origin of the slit. Orienting the slit at an acute angle can enhance the sealing of the strain relief device around the telecommunication drop cables when the plug is inserted into the central bore. Optionally, each slit 116 can have a chamfered entrance portion 118 to assist in opening the slit when inserting the telecommunication drop cable into the cable passage 114 as shown in FIGS. 3A and 3B.

FIGS. 3B, 4A and 4B show top views of a tubular body 110, 210, 310 for the exemplary strain relief device having a rectangular central bore 112, 212, 312 and six circular cable passages 114, 214, 314. FIG. 4A shows an exemplary embodiment of the tubular housing 210 which does not have the chamfered entrance portion for slit 216. FIG. 4C shows a top view of another exemplary tubular body 410 having a circular central bore 412 and four rectangular cable passages 414.

Each cable passage 114 can have thin web (not shown) extending across the cable passage at one of its first end or its second end. The thin web preserves the sealing capability of the strain relief device prior to the installation of a telecommunication drop cable into the cable passage. Alternatively, the cable passages may be blocked by small rigid plugs having a cross section similar to the telecommunication drop cable to be installed in the cable passage at a later time.

Using the exemplary strain relief device enables the installation of a number of cables less than or equal to the number of cable passages present in the tubular body. In order to install cables through the exemplary strain relief device, the thin web closing the cable passage through the tubular body must be perforated or removed by tearing the thin web. Alternatively, a pre-slit membrane or a cable passage that does not have a membrane may be used in cases where only moderate environmental sealing is needed.

Figure 2:
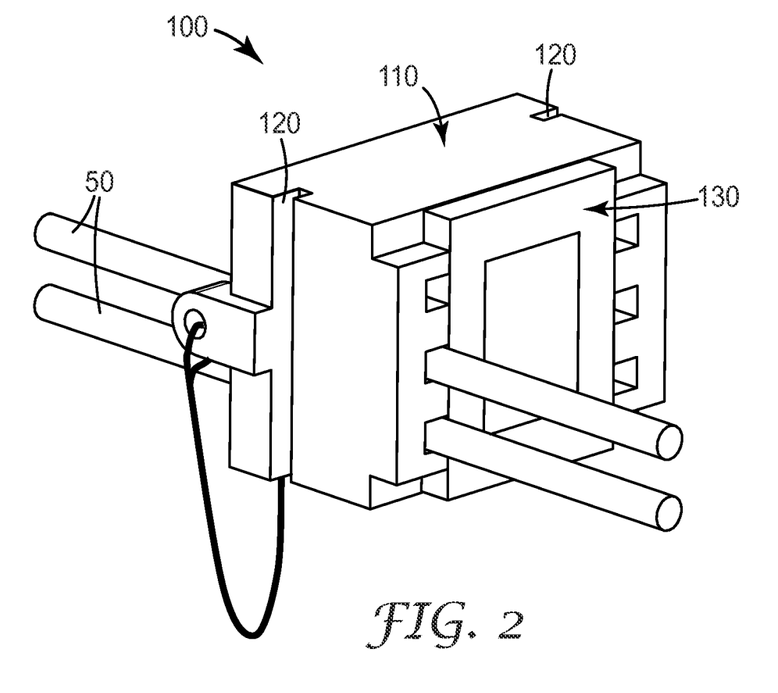
FIG. 2 is an isometric view of the exemplary strain relief device of FIG. 1A having two telecommunication drop cables installed therein.

FIG. 2 shows an exemplary strain relief device 100 having two telecommunication drop cables 50 installed into the device. When two preterminated telecommunication drop cables are to be installed through the strain relief device, two of the thin web portions can be removed. Referring to FIG. 3B, connector 10 of the first preterminated drop cable can be inserted through the central bore 112 of strain relief device 100. After a sufficient amount of telecommunication drop cable has been fed through, the drop cable can be pressed against the entrance portion 118 of a first slit 116 leading to a first cable passage 114 to open the slit. The drop cable can be moved through the slit until it is properly seated within the cable passage. The process can be repeated for the insertion of a second telecommunication drop cable into a second cable passage. The remaining cable passages are still closed by the remaining thin web portions ensuring a good environmental seal when installed in an entry portion of a telecommunication enclosure. When an additional cable is needed, for example an additional service connection, one of the remaining thin web portions can be removed to allow insertion of the new telecommunication drop cable.

The tubular body 110 of the strain relief device 100 can be formed from, for example, elastomeric and polymeric materials, such as thermoplastic elastomers, vulcanite rubbers, polyurethane foams, reactive and non-reactive polymers, and soft plastics, to name a few. Material selection will depend upon factors including, but not limited to, material durometer, chemical and environmental exposure conditions including temperature and humidity conditions, and flame-retardancy requirements. In a preferred embodiment, the material of the tubular body is an elastomeric material that deforms sufficiently to allow the cable passages to form a resilient seal against telecommunication drop cables 50. In one exemplary aspect, the material can have a hardness in the range of 40 to 90 durometer (Shore 'A'). In another exemplary aspect, the material can be a urethane based material having a hardness in the range of 60 to 70 durometer (Shore 'A').

In addition, the strain relief device 100 can have at least one slot 120 in an external wall of the tubular body to facilitate the installation and securing of the device in the entry portion of a telecommunication enclosure. In an exemplary aspect, the strain relief device can have two slots 120 disposed on two opposite sides of the tubular body and generally perpendicular to the central bore of the device as shown in FIGS. 1A and 2. For example, the strain relief device 100 may be installed in an entry portion 532 of a telecommunication enclosure 530 such as fiber distribution terminal or a fiber distribution hub shown in FIGS. 5A and 5B, such as by sliding the strain relief device into the U-slot of the cable entry portion such that the edges of the U-slot are carried within the slots in the tubular body of the strain relief device.

The plug 130 of the exemplary strain relief device 100 can be inserted into the central bore 112 of the tubular body. The plug can be formed from a rigid material such as a rigid engineering plastic or glass filled polymer, or a metal such as anodized aluminum or brass. Exemplary materials can include a polycarbonate material such as Lexan® 500 or a blend of semi-crystalline polyesters such as a Xenoy® resin both available from SABIC Innovative Plastics (Pittsfield, Mass.).

Plug 130 has a base portion 132 (see FIG. 1C) sized to fit snugly within the central bore 112 of the tubular body 110 and a cap portion 134 attached to one end of the base portion. The cap portion can be larger than the base portion so that the plug can not be inserted completely through the central bore of the tubular body. In an exemplary aspect, the body portion 132 of plug 130 can have at least one lip or barb 136 disposed at the end opposite the cap portion 134. The lip can engage with the edge of the central bore to secure the plug within the tubular body of the strain relief device. In an alternative exemplary aspect, the base portion may have a gradual taper, such that the base portion can be slightly larger near the cap portion and slightly smaller at the end opposite the cap portion. Alternatively, the central bore of the tubular body of the strain relief device can be tapered.

In an exemplary aspect the base portion 132 and the cap portion 134 of plug 130 may be integrally formed as a single piece. Alternatively the base portion and the cap portion may be formed of two separate pieces that are joined together by a mechanical fastener, a weld, an adhesive or other conventional joining technique.

Figure 1B:
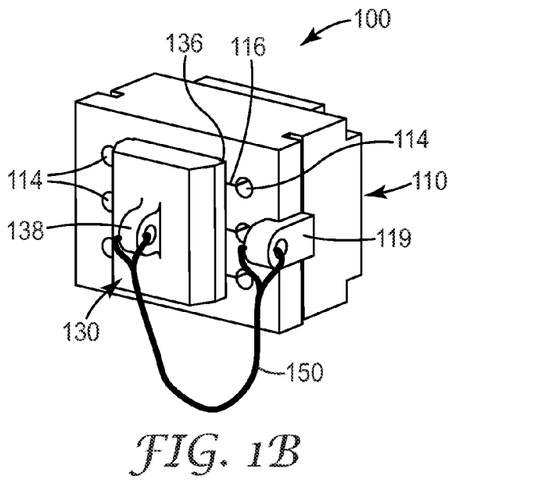
Figure 1C:
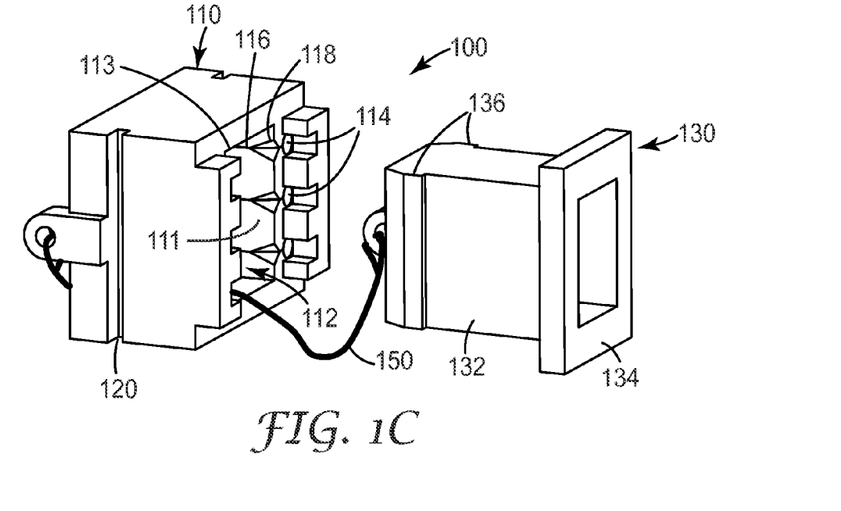
FIG. 1C is a partially exploded view of the exemplary strain relief device of FIG. 1A.

In another exemplary embodiment, the strain relief device 100 can also include a lanyard 150 connecting the plug 130 to the tubular body 110. The lanyard helps retain the plug when it is removed from the tubular body during cable installation or maintenance procedures, thus preventing the plug from being accidentally lost. The lanyard 150 can be attached to plug 130 by a plug anchor 138 and attached to the tubular body 110 by a body anchor 119 as shown in FIG. 1B. The lanyard can be in the form of a string, small chain or cable.

When the tubular body is constrained within the entrance portion of the telecommunication enclosure, insertion of the plug into the central bore of the strain relief device simultaneously seals and secures the telecommunication cables in the cable passages by exerting a lateral outward compressive force to the tubular body causing the deformation of the more compliant tubular body to form a seal around the telecommunication drop cables passing through the strain relief device. Alternatively, the entire strain relief device can be removed from the entrance portion of the telecommunication enclosure for easier access and servicing. In this case, the plug could be inserted loosely after the cables have been installed into the cable passages of the strain relief device and the insertion of the strain relief device into the entrance portion of the telecommunication enclosure would provide an inward compressive force to seal and grip the cables and the plug.

Figure 6:
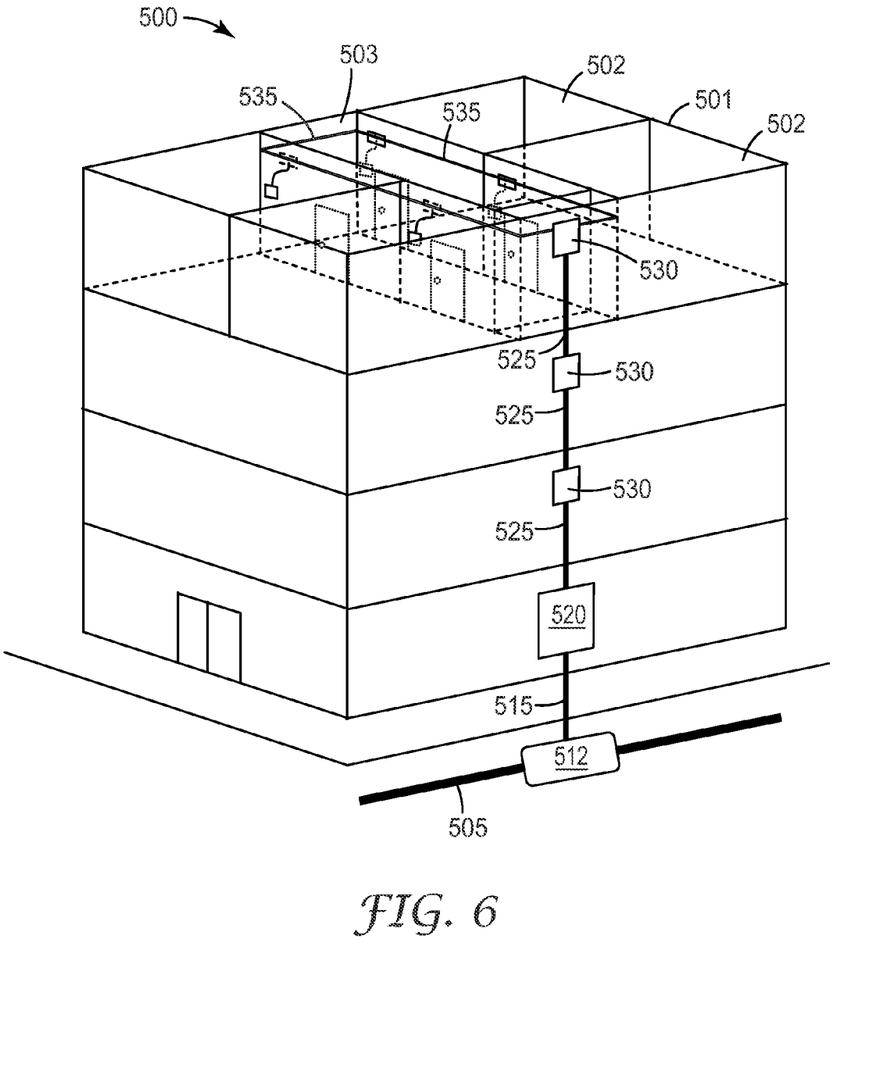
FIG. 6 is a schematic view of an exemplary multi-dwelling unit having a plurality of telecommunication enclosures in which exemplary strain relief device according to the current invention may be used.

The exemplary strain relief device can be used for cabling applications within a multi-dwelling unit (MDU), office or other premise location. FIG. 6 shows an example a multi-dwelling unit or building 500 having a fiber distribution hub (FDH) 520 as well as a fiber distribution terminal (FDT) 530 in which the exemplary strain relief device may be used. The multi-dwelling unit can be a multi-floor structure having a plurality of living units located on each floor thereof. One example floor 501 of an exemplary MDU has four living units 502 having a common hallway 503.

A feeder cable 505 brings communications lines to and from building 500. These communication lines can be spliced to building feeder lines 515 of the multi-dwelling unit cabling at a splice closure 512. The building feeder lines 515 can be distributed to the building from the FDH 520 through riser cables 525 which run to the FDTs 530 located on each floor of the a MDU. The exemplary strain relief device 100 can be used to secure the riser cables 525 in the entrance (exit) portion of the FDH 520. Additionally, the exemplary strain relief devices 100 may be used in the FDTs 530 on each floor to secure the telecommunication drop cables 535 that exit the FDT and run to each living unit 502. Alternatively, in a direct run architecture, all of the telecommunication drop cables may run from the FDH to the individual living units on each floor of the MDU unit.

Figure 5A:
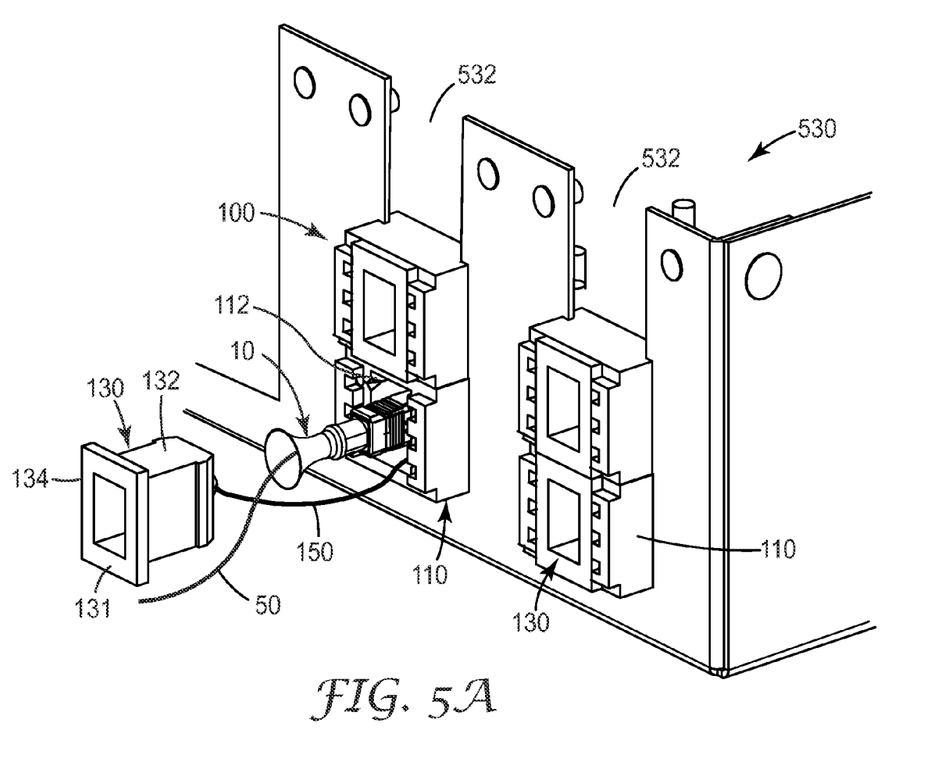
FIGS. 5A and 5B are two partial isometric views of a telecommunication enclosure having a plurality of exemplary strain relief devices installed therein according to the current invention.
Figure 5B:
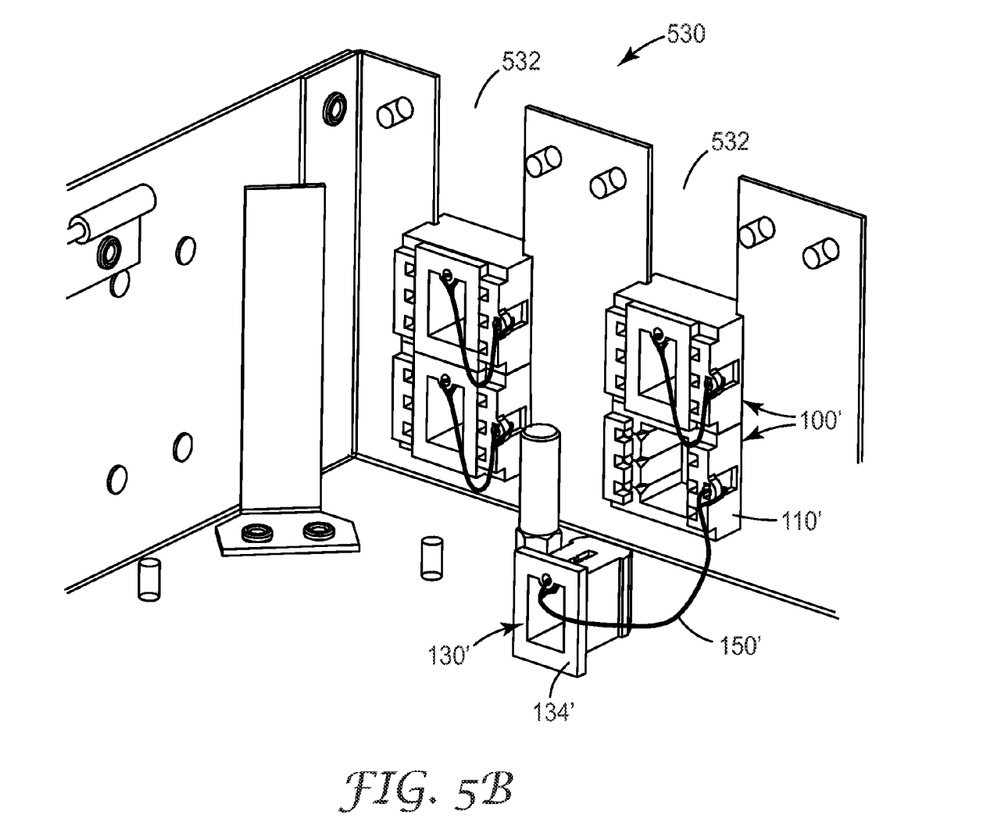

FIGS. 5A and 5B show a partial view of a telecommunication enclosure, such as fiber distribution terminal 530, having a plurality of exemplary strain relief devices installed in an entry portion of the enclosure. In an exemplary aspect, the plug 130 may be inserted into the tubular body 110 from outside the telecommunication enclosure as shown in FIG. 5A. The lanyard 150 can be attached to the body portion 132 of the plug at the end opposite the cap portion 134. The lanyard 150 will pass through the central bore 112 of the tubular body when the plug 130 is removed from the central bore so that the connector 10 on the end of the preterminated drop cable 50 may be fed through the central bore of the device. The plug 130 can have a low profile cap portion 134 to help prevent unwanted tampering when the plug is installed in the strain relief device.

In an alternative exemplary aspect, the plug 130' may be inserted into the tubular body 110' from within the fiber distribution terminal 530 as shown in FIG. 5B. The lanyard 150' can be attached to the cap portion 134' of the plug. The lanyard 150' and plug 130' will remain within the FDT when the plug is removed from the central bore so that a connector on the end of the preterminated drop cable may be fed through the central bore of the device.

Advantageously, the exemplary strain relief devices, described herein, enable an installer to produce a reliable environmental seal regardless of the number of cables installed through the sealing member. The exemplary strain relief devices also allow for subsequent addition of one or more new cables into a telecommunication enclosure without the need to disturb the previously installed cables. The lanyard retains the plug during cable installation or maintenance to prevent the plug from being lost. Finally, the exemplary strain relief devices can be easily and quickly installed, and can be easily re-entered and re-used multiple times without seal degradation.

Various modifications including extending the use of the exemplary sealing members to applications with optical fiber telecommunication drop cables, copper telecommunication drop cables or copper coax drop cables, equivalent processes, as well as numerous structures to which the present invention may be applicable will be readily apparent to those of skill in the art to which the present invention is directed upon review of the present specification.

What is claimed is:

1. A strain relief device to allow the passage of one or more telecommunication drop cables therethrough, the strain relief device comprising:
    a tubular body comprising a central bore that defines a longitudinal axis and an interior surface of the tubular body and a plurality of cable passages disposed around the central bore, wherein the central bore includes a perimeter that is larger than a perimeter of each of the plurality of cable passages;
    a plurality of slits formed in the tubular body wherein each slit extends from the interior surface of the tubular body between the central bore and one of the plurality of cable passages to allow insertion of a telecommunication drop cable into one of cable passages; and
    a plug to block the central bore and secure the one or more telecommunication drop cables within the cable passages.

2. The strain relief device of claim 1, wherein the slit extends perpendicularly from the interior surface of the tubular body.

3. The strain relief device of claim 1, wherein the slit extends from the interior surface of the tubular body at an acute angle relative to a tangent to the perimeter of the central bore.

4. The strain relief device of claim 1, wherein each slit has a chamfered entrance portion.

5. The strain relief device of claim 1, wherein the one or more telecommunication cables is a pre-terminated drop cable having a connector disposed on a terminal end of the cable and wherein the central bore through the tubular body is sized to allow the connector to be inserted therethrough.

6. The strain relief device of claim 1, wherein the telecommunication drop cable includes an optical connector mounted on a terminal end thereof.

7. The strain relief device of claim 1, further comprising a lanyard connecting the plug to the tubular body.

8. The strain relief device of claim 1, wherein the tubular body is made of one of a rubber material and an elastomeric material.

9. The strain relief device of claim 1, wherein the plug is made of a rigid material.

10. The strain relief device of claim 1, wherein the strain relief device is insertable into a cable entry portion of a telecommunication enclosure.

11. The strain relief device of claim 1, wherein the strain relief device provides an environmental seal around the one or more telecommunication cables passing therethrough.

12. A method of installing a pre-terminated drop cable through a strain relief device, wherein the preterminated drop cable comprises a connector mounted on a terminal end of a drop cable, the method comprising:
    providing the strain relief device comprising a tubular body that includes a central bore and a plurality of cable passages formed in the tubular body and disposed around the central bore;
    inserting the connector and a portion of the drop cable through the central bore of the tubular body;
    moving the drop cable into one of the plurality of cable passages through a slit that extends from an interior surface of the tubular body between the central bore and one of the plurality of cable passages from the central bore; and inserting a plug into the central bore of the tubular housing to block the central bore.

13. The method of claim 12, further comprising: installing the strain relief device in an entrance portion of a telecommunication enclosure.

14. The method of claim 13, further comprising: removing a thin web within the cable passage to allow the drop cable to be placed in the cable passage.

* * * * *